United States Patent
Kato et al.

(10) Patent No.: US 11,897,281 B2
(45) Date of Patent: Feb. 13, 2024

(54) WHEEL FOR RAILWAY VEHICLE

(71) Applicant: NIPPON STEEL CORPORATION, Tokyo (JP)

(72) Inventors: Takanori Kato, Tokyo (JP); Yoshinari Yamamura, Tokyo (JP); Shingo Abe, Tokyo (JP); Jun Noguchi, Tokyo (JP); Ruben De La Prida Caballero, Madrid (ES)

(73) Assignee: NIPPON STEEL CORPORATION, Tokyo (JP)

( * ) Notice: Subject to any disclaimer, the term of this patent is extended or adjusted under 35 U.S.C. 154(b) by 101 days.

(21) Appl. No.: 17/595,450

(22) PCT Filed: May 20, 2020

(86) PCT No.: PCT/JP2020/019885
§ 371 (c)(1),
(2) Date: Nov. 17, 2021

(87) PCT Pub. No.: WO2020/241401
PCT Pub. Date: Dec. 3, 2020

(65) Prior Publication Data
US 2022/0212494 A1 Jul. 7, 2022

(30) Foreign Application Priority Data
May 29, 2019 (JP) ................................ 2019-099982

(51) Int. Cl.
*B60B 17/00* (2006.01)
(52) U.S. Cl.
CPC ...... *B60B 17/0006* (2013.01); *B60B 17/0068* (2013.01); *B60Y 2200/30* (2013.01)

(58) Field of Classification Search
CPC ............ B60B 17/0006; B60B 17/0068; B60Y 2200/30
See application file for complete search history.

(56) References Cited

U.S. PATENT DOCUMENTS

| | | | | |
|---|---|---|---|---|
| 701,292 | A * | 6/1902 | Canda | B60B 17/0006 295/17 |
| 4,145,079 | A * | 3/1979 | Greenfield | B60B 17/0006 295/21 |
| 4,471,990 | A * | 9/1984 | Hirakawa | B60B 17/0006 295/1 |

(Continued)

FOREIGN PATENT DOCUMENTS

| | | |
|---|---|---|
| DE | 102011013081 A1 | 9/2012 |
| DE | 102011121785 A1 | 6/2013 |

(Continued)

*Primary Examiner* — S. Joseph Morano
*Assistant Examiner* — Emily G. Castonguay
(74) *Attorney, Agent, or Firm* — Greer Burns & Crain Ltd.

(57) ABSTRACT

A wheel includes a boss, a rim, and a web. The rim includes a tread and a flange. The web connects the boss and the rim. When the wheel is viewed in its longitudinal section, the web has a linear plate-thickness center line that is inclined such that the plate-thickness center line approaches the flange side as it extends outward in a radial direction. When the wheel is viewed in its longitudinal section, an outer end of the plate-thickness center line is positioned between the flange and a center of the tread in an axial direction of the wheel.

7 Claims, 4 Drawing Sheets

(56) References Cited

U.S. PATENT DOCUMENTS

| | | | | |
|---|---|---|---|---|
| 5,333,926 A | * | 8/1994 | Christie | B60B 17/0006 295/24 |
| 5,899,517 A | * | 5/1999 | Murawa | B60B 17/00 295/1 |
| 5,957,519 A | | 9/1999 | Brouke et al. | |
| 6,033,001 A | * | 3/2000 | Fujimura | B21K 1/38 295/21 |
| 6,227,591 B1 | * | 5/2001 | Runkle | B60B 17/0006 295/17 |
| 2003/0075942 A1 | * | 4/2003 | Landrot | B60B 17/0006 295/30.1 |
| 2014/0300122 A1 | | 10/2014 | Golyshkov et al. | |

FOREIGN PATENT DOCUMENTS

| | | |
|---|---|---|
| EP | 1389539 A1 | 2/2004 |
| JP | 10029401 A | 2/1998 |
| JP | 2004131002 A | 4/2004 |
| JP | 2009545484 A | 12/2009 |
| JP | 2015500177 A | 1/2015 |
| WO | 2008015712 A1 | 2/2008 |

\* cited by examiner

Comparative Example 1

Comparative Example 2

Comparative Example 3

Comparative Example 4

Comparative Example 5

WHEEL FOR RAILWAY VEHICLE

TECHNICAL FIELD

The present disclosure relates to a wheel used in a railway vehicle.

BACKGROUND ART

A wheel of a railway vehicle includes a boss, a rim, and a web. An axle of the railway vehicle is to be inserted into the boss. The rim forms an outer circumferential portion of the wheel and includes a tread and a flange. The tread is a surface that is to come into contact with a top surface of a rail. The flange protrudes from the tread outward in a radial direction of the wheel. The web connects the rim and the boss.

There have been various shapes of wheels for railway vehicles. For example, Patent Literature 1 discloses a wheel in which a web connecting a rim and a boss is bent. In Patent Literature 1, the web has a plate-thickness center line that is curvilinear when the wheel is viewed in its longitudinal section. The plate-thickness center line has a center that is an inflection point of the plate-thickness center line and symmetric about the center.

Patent Literatures 2 and 3 also disclose wheels including a web that is bent. In Patent Literatures 2 and 3, a plate-thickness center line of the web has a shape that is convex on an opposite side to a flange when the wheel is viewed in its longitudinal section. In other words, the plate-thickness center line is a curve with both ends being closer to the flange than a center of the plate-thickness center line is close to.

CITATION LIST

Patent Literature

Patent Literature 1: Japanese Patent Application Publication No. 10-29401
Patent Literature 2: Japanese Translation of PCT International Application Publication No. 2009-545484
Patent Literature 3: Japanese Translation of PCT International Application Publication No. 2015-500177

SUMMARY OF INVENTION

Technical Problem

As one type of braking device for a wheel for a railway vehicle, a tread brake is known. In a tread brake, a brake shoe is pressed against a tread of a wheel to apply a brake to a railway vehicle. During braking of the railway vehicle, frictional heat is produced between the tread and the brake shoe. As a result, a temperature of the wheel, particularly a temperature of a rim that forms an outer circumferential portion of the wheel rises, causing heat deformation of the rim. When displacement occurs in the rim due to heat deformation, traveling stability of a railway vehicle is affected. In particular, displacement of the rim in an axial direction of the wheel may induce meandering or derailing of the railway vehicle. In addition, the heat deformation of the rim and the occurrence of the thermal stress in the web during braking of the railway vehicle may cause a fatigue fracture of the wheel. It is therefore necessary to reduce the displacement of the rim in the axial direction of the wheel and to reduce the thermal stress occurring in the web during braking of the railway vehicle with the tread brake. However, with conventional wheels as exemplified by Patent Literatures 1 to 3, it is difficult to reduce both displacement of a rim and thermal stress in a web that occur during braking, at the same time.

An objective of the present disclosure is to provide a wheel for a railway vehicle that can reduce a displacement of its rim in an axial direction of the wheel and a thermal stress occurring in its web at the same time during braking of the railway vehicle with a tread brake.

Solution to Problem

A wheel according to the present disclosure is to be used in a railway vehicle. The wheel includes a boss, a rim, and a web. The boss forms an inner circumferential portion of the wheel. An axle of the railway vehicle is to be inserted into the boss. The rim forms an outer circumferential portion of the wheel. The rim includes a tread and a flange. The tread is to come into contact with a top surface of a rail on which the railway vehicle travels. The flange protrudes from the tread outward in a radial direction of the wheel. The web has an annular shape and connects the rim and the boss. When the wheel is viewed in its longitudinal section, the web has a linear plate-thickness center line that is inclined such that the plate-thickness center line approaches the flange side as it extends outward in the radial direction. When the wheel is viewed in its longitudinal section, an outer end of the plate-thickness center line is positioned between the flange and a center of the tread in an axial direction of the wheel. The outer end is one of both ends of the plate-thickness center line that is positioned more outward in the radial direction.

Advantageous Effect of Invention

With a wheel for a railway vehicle according to the present disclosure, it is possible to reduce a displacement of its rim in an axial direction of the wheel and a thermal stress occurring in its web at the same time during braking of the railway vehicle with a tread brake.

DESCRIPTION OF EMBODIMENTS

Figure 1:
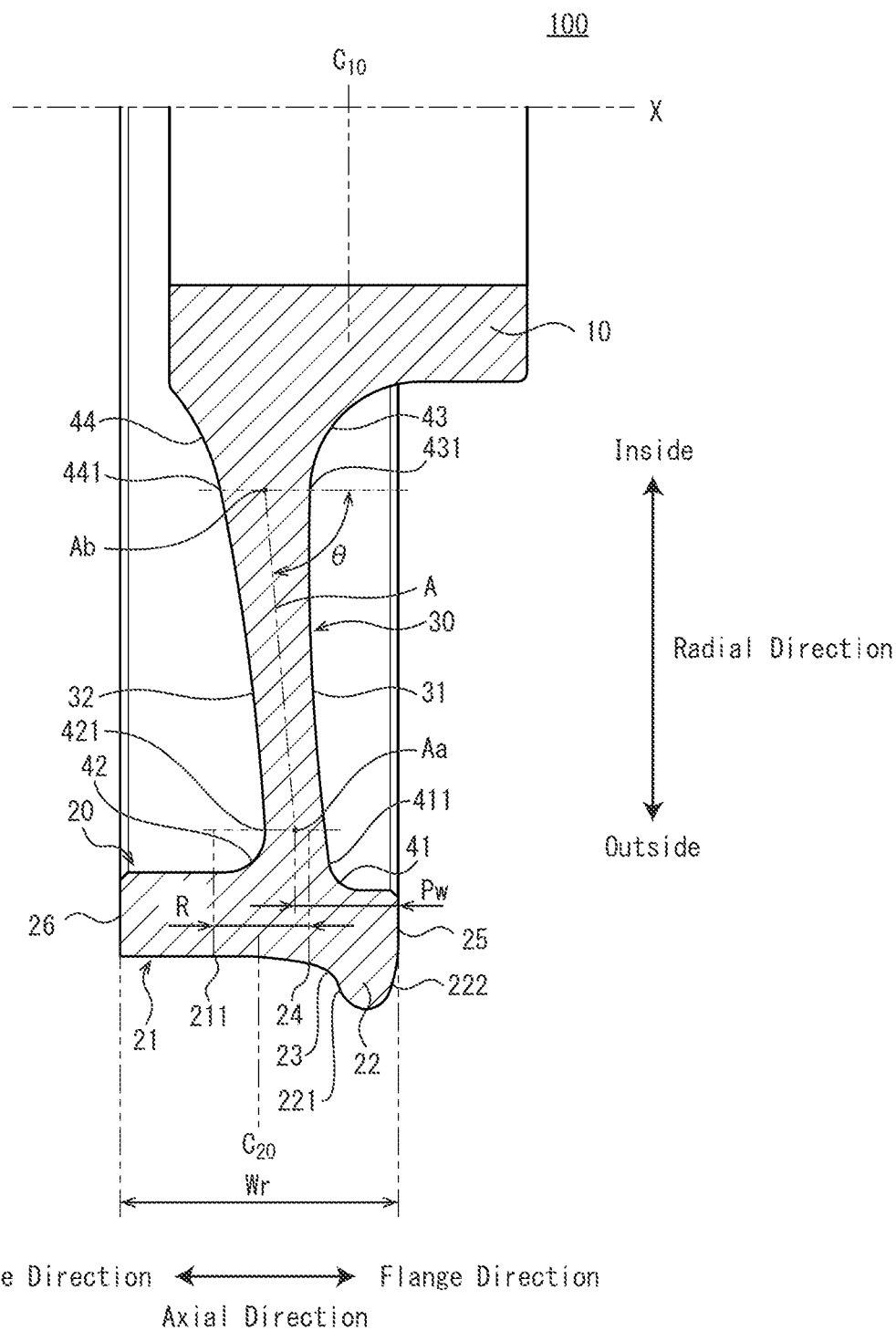
FIG. 1 is a longitudinal sectional view of a wheel for a railway vehicle according to an embodiment.

A wheel according to an embodiment is used in a railway vehicle. The wheel includes a boss, a rim, and a web. The boss forms an inner circumferential portion of the wheel. An axle of the railway vehicle is to be inserted into the boss. The rim forms an outer circumferential portion of the wheel. The rim includes a tread and a flange. The tread is to come into contact with a top surface of a rail on which the railway vehicle travels. The flange protrudes from the tread outward in a radial direction of the wheel. The web has an annular shape and connects the rim and the boss. When the wheel is viewed in its longitudinal section, the web has a linear plate-thickness center line that is inclined such that the plate-thickness center line approaches the flange side as it extends outward in the radial direction. When the wheel is viewed in its longitudinal section, an outer end of the plate-thickness center line is positioned between the flange and a center of the tread in an axial direction of the wheel. The outer end is one of both ends of the plate-thickness center line that is positioned more outward in the radial direction (first configuration).

When a brake shoe of a tread brake is pressed against a tread of a wheel, producing frictional heat, a rim deforms by heat to be displaced in an axial direction of the wheel. In the axial direction of the wheel, when a direction toward a side on which the flange is disposed is referred to as a flange direction, and the opposite direction is referred to as a counter-flange direction, the rim generally tends to be displaced in the flange direction. In contrast, in the wheel of the first configuration, the plate-thickness center line of the web is linear and is inclined such that the plate-thickness center line approaches the flange side as it extends outward in the radial direction of the wheel when the wheel is viewed in its longitudinal section. When the rim is to be displaced in the flange direction, the web having such a plate-thickness center line resists the displacement of the rim, so that the displacement can be inhibited. It is therefore possible to reduce the displacement of the rim in the axial direction during braking of a railway vehicle with a tread brake. In addition, since the plate-thickness center line has no inflection point, stress concentration is unlikely to occur in the web. It is therefore possible to reduce thermal stress occurring in the web during braking of a railway vehicle with a tread brake.

With the first configuration, a displacement of the rim in the axial direction is reduced, so that the rim resists swinging with respect to the web. It is therefore possible to reduce stress occurring in a root portion of the rim in the web. In addition, by positioning the outer end of the plate-thickness center line between the flange and the center of the tread, it is possible to reduce thermal stress occurring in the web during braking of a railway vehicle.

A distance in the axial direction from a side face of the rim on the flange side to the outer end of the plate-thickness center line is preferably 0.3 times or more a length of the rim in the axial direction (second configuration).

An angle that the plate-thickness center line forms with the axial direction on the flange side is preferably 87° or less (third configuration).

The web preferably has a plate thickness that decreases as the web extends outward in the radial direction until a point inward from the outer end of the plate-thickness center line and has a minimum plate thickness at the point (fourth configuration).

An embodiment of the present disclosure will be described below with reference to the drawings. In the drawings, the same or equivalent components will be denoted by the same reference characters and repetitive description thereof will not be made.

FIG. 1 is a longitudinal sectional view of a wheel 100 according to the present embodiment. The longitudinal section refers to a cross section of the wheel 100 taken along a plane including a central axis X of the wheel 100. The longitudinal section of the wheel 100 is symmetric about the central axis X, and thus FIG. 1 illustrates the wheel 100 on one side of the central axis X only. In the present embodiment, a direction in which the central axis X of the wheel 100 extends will be referred to as an axial direction, and a radial direction of the wheel 100 will be simply referred to as a radial direction.

Referring to FIG. 1, the wheel 100 is used in a railway vehicle. The wheel 100 includes a boss 10, a rim 20, and a web 30.

The boss 10 forms an inner circumferential portion of the wheel 100. The boss 10 has a substantially cylindrical shape the axial centerline of which is the central axis X. An axle of the railway vehicle (not illustrated) is to be inserted into the boss 10.

The rim 20 forms an outer circumferential portion of the wheel 100. The rim 20 is disposed outside the boss 10 in the radial direction. In addition, the rim 20 is positioned so as to be outward from the boss 10 in a track-width direction. In other words, a rim-width center $C_{20}$ illustrated by a two-dot chain line in FIG. 1 is positioned outward from a boss-width center $C_{10}$ illustrated similarly by a two-dot chain line on a track.

The rim 20 includes a tread 21 and a flange 22. The tread 21 faces outward in the radial direction. The tread 21 is to come into contact with a top surface of a rail on which the railway vehicle travels. A diameter of the tread 21 gradually increases toward the flange 22. A shape of the tread 21 is not limited to a particular shape. For example, the tread 21 may be a conical tread or may be an arc tread.

The flange 22 is provided at one end of the rim 20 in the axial direction. In the axial direction of the wheel 100, a direction toward a side on which the flange 22 is disposed will be referred to as a flange direction, and the opposite direction will be referred to as a counter-flange direction. The flange 22 protrudes from the tread 21 outward in the radial direction. When the railway vehicle travels on right and left rails, the flange 22 is positioned inward from the rails. The flange 22 includes side faces 221 and 222. When the wheel 100 is viewed in its longitudinal section, the side faces 221 and 222 each have a curve shape including one or more types of arcs.

The side face 221 is disposed on a side close to the tread 21 in the axial direction. The side face 221 is connected to the tread 21 via a throat 23. When the wheel 100 is viewed in its longitudinal section, the throat 23 has a curve shape including one or more types of arcs and connects the side face 221 to the tread 21 smoothly. A curvature of a surface of the rim 20 changes at a boundary 24 between the throat 23 and the tread 21. A portion of the tread 21 adjacent to the boundary 24 has a curvature the absolute value of which is significantly smaller than absolute values of curvatures of the side face 221 of the flange 22 and the throat 23.

The side face 222 is disposed on an opposite side to the side face 221 in the axial direction. The side face 222 is connected to a side face 25, which is one of both side faces 25 and 26 of the rim 20.

The web 30 has an annular shape. The web 30 connects the boss 10 and the rim 20. The web 30 has a plate thickness that is smaller as a whole than thicknesses of the boss 10 and the rim 20. The thicknesses of the boss 10 and the rim 20 refer to lengths of the boss 10 and the rim 20 in the axial direction, respectively. The plate thickness of the web 30 is a length of the web 30 in the axial direction. The plate thickness of the web 30 is large on its boss 10 side and small on its rim 20 side.

The web 30 includes side faces 31 and 32. The side face 31 is a face disposed on a flange 22 side in the axial direction. The side face 32 is positioned on an opposite side to the side face 31 in the axial direction. When the wheel 100 is viewed in its longitudinal section, the side faces 31 and 32 are connected to the rim 20 via arcs 41 and 42, respectively. The side faces 31 and 32 are connected to the boss 10 via arcs 43 and 44, respectively.

In the present embodiment, one of an end 411 of the arc 41 on the web 30 side and an end 421 of the arc 42 on the web 30 side that is positioned more inward than the other in the radial direction is defined to be an outer circumference end of the web 30. In addition, one of an end 431 of the arc 43 on the web 30 side and an end 441 of the arc 44 on the web 30 side that is positioned more outward than the other in the radial direction is defined to be an inner circumference end of the web 30. The outer circumference end of the web 30 can be regarded as a root of the rim 20 for the web 30. The inner circumference end of the web 30 can be regarded as a root of the boss 10 for the web 30. In the present embodiment, the end 421 of the arc 42 and the end 441 of the arc 44 are the outer circumference end and the inner circumference end of the web 30, respectively.

The plate thickness of the web 30 decreases as the web 30 extends outward in the radial direction until a position inward from the outer circumference end 421 and is minimized at the position. In other words, the web 30 has its minimum plate thickness at a portion inward from the outer circumference end 421 in the radial direction and in a vicinity of the outer circumference end 421. A position at which the plate thickness of the web 30 is minimized substantially coincides with a position at which a bending stress produced in the web 30 by a bending load received by the wheel 100 from a rail when the railway vehicle passes a curve is minimized. For example, the plate thickness of the web 30 can be minimized at a position that is 5 mm to 30 mm inward from the outer circumference end 421 in the radial direction.

The web 30 has a plate-thickness center line A. The plate-thickness center line A is a line that passes midpoints between the side faces 31 and 32 and extends from the boss 10 side to the rim 20 side. When the wheel 100 is viewed in its longitudinal section, the plate-thickness center line A has a linear shape. A linear shape herein includes not only a perfect straight line but also a very gentle arc having a curvature radius of, for example, 1000 mm or more, or even a polygonal chain. In other words, the plate-thickness center line A is any line that can be recognized as a substantially straight line when the wheel 100 is viewed in its longitudinal section. Since the plate-thickness center line A has a linear shape when the wheel 100 is viewed in its longitudinal section, the web 30 has a substantially flat disk shape and is not bent in the axial direction.

When the wheel 100 is viewed in its longitudinal section, the plate-thickness center line A is inclined with respect to the radial direction such that the plate-thickness center line A approaches the flange 22 side as it extends outward in the radial direction. Of both ends Aa and Ab of the plate-thickness center line A, the end Aa, which is positioned outward in the radial direction, will be referred to as an outer end of the plate-thickness center line A, and the end Ab, which is positioned inward in the radial direction, will be referred to as an inner end of the plate-thickness center line A. The outer end Aa of the plate-thickness center line A is a point at which the plate-thickness center line A is connected to a straight line that passes the outer circumference end 421 of the web 30 and extends in the axial direction. The inner end Ab of the plate-thickness center line A is a point at which the plate-thickness center line A is connected to a straight line that passes the inner circumference end 441 of the web 30 and extends in the axial direction.

In the axial direction, the outer end Aa of the plate-thickness center line A is positioned within a range R between the flange 22 and a center 211 of the tread 21. In other words, the outer end Aa is disposed on the counter-flange direction side with respect to the side face 221 of the flange 22. In addition, the outer end Aa is disposed on the flange direction side with respect to the center 211 of the tread 21. The center 211 of the tread 21 refers to a middle position in the axial direction between the boundary 24 between the tread 21 and the throat 23 and the side face 26 of the rim 20.

By disposing the outer end Aa of the plate-thickness center line A between the flange 22 and the center 211 of the tread 21, a distance in the axial direction between the web 30 and the side face 25 of the rim 20 on the flange 22 side is kept. Suppose a distance in the axial direction from the side face 25 of the rim 20 to the outer end Aa of the plate-thickness center line A is denoted by a web position Pw. The web position Pw is determined as appropriate in accordance with specifications of a tread brake used for the wheel 100 or the like. For example, the web position Pw [mm] is preferably 0.3 times or more a width Wr [mm] of the rim 20 (Pw/Wr≥0.3). The web position Pw [mm] is preferably 0.6 times or less the width Wr [mm] of the rim 20 (Pw/Wr≤0.6). The width Wr of the rim 20 is a length of the rim 20 in the axial direction, and is a maximum distance from the side face 25 on the flange 22 side to the side face 26 on the opposite side in the axial direction.

When the wheel 100 is viewed in its longitudinal section, the plate-thickness center line A forms an angle θ with the axial direction on the flange 22 side. In a case where the plate-thickness center line A is a very gentle curve, the angle θ is determined to be an angle formed by a tangential line at a center of the plate-thickness center line A (midpoint between the outer end Aa and the inner end Ab) with the axial direction. In a case where the plate-thickness center line A is a polygonal chain, the angle θ is determined to be an angle formed by the longest segment among segments included in the plate-thickness center line A with the axial direction.

The angle θ is less than 90°. The angle θ is preferably 87° or less, which however depends on specifications of a tread brake used for the wheel 100 or the like. The angle θ is preferably 75° or more.

Advantageous Effects of Embodiment

Figure 2:
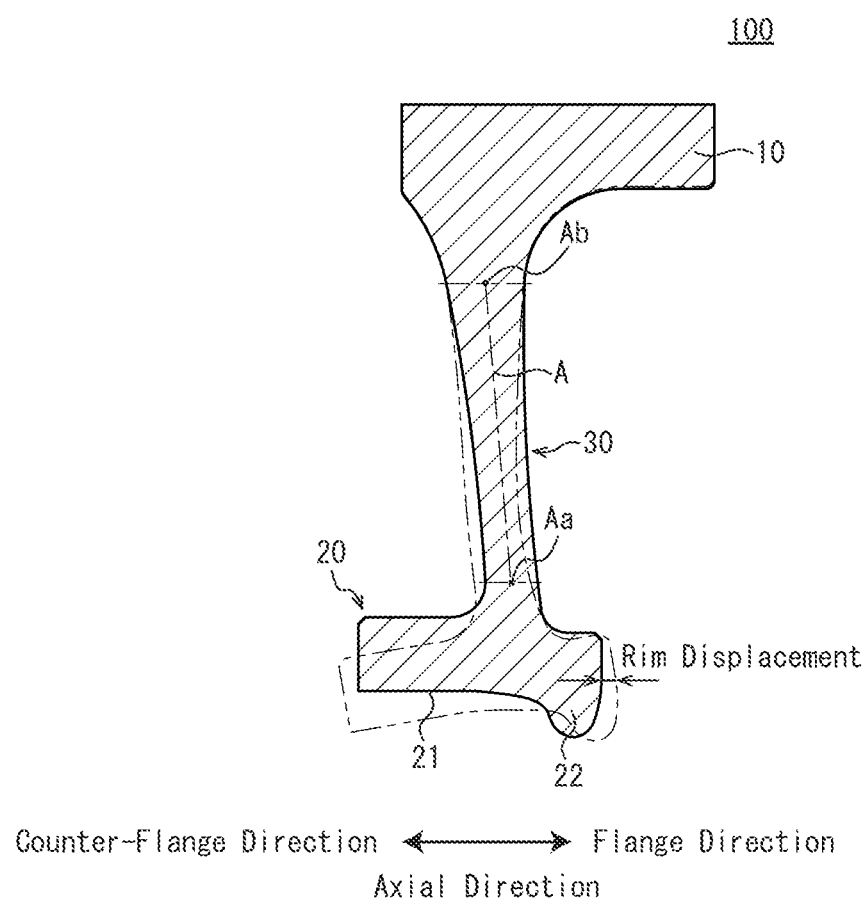
FIG. 2 is a diagram exemplifying a deformation occurring in a wheel during braking with a tread brake in an exaggerated manner.

FIG. 2 is a diagram illustrating only a section of the wheel 100 illustrated in FIG. 1 and exemplifying a deformation occurring in the wheel 100 during braking with a tread brake in an exaggerated manner. Referring to FIG. 2, when a brake shoe of the tread brake is pressed against the tread 21 of the wheel 100, the rim 20 is subjected to heat deformation by friction and tends to be displaced toward the flange 22 side in the axial direction (in the flange direction). However, in the wheel 100 according to the present embodiment, it is possible to reduce such displacement of the rim 20. In the wheel 100, the plate-thickness center line A of the web 30 has a linear shape when the wheel 100 is viewed in its longitudinal section. In addition, the plate-thickness center line A is inclined such that the plate-thickness center line A approaches the flange 22 side as it extends outward in the radial direction. As a result, even though the rim 20 is to be displaced in the flange direction during braking of a railway vehicle with tread brakes, the web 30 resists the displacement of the rim 20, so that the displacement can be inhibited. It is therefore possible to reduce the displacement of the rim 20 in the axial direction.

In the wheel 100 according to the present embodiment, since the plate-thickness center line A is linear when the wheel 100 is viewed in its longitudinal section, the web 30 has substantially no inflection point. As a result, stress concentration is unlikely to occur in the web 30 during braking of the railway vehicle with a tread brake. It is therefore possible to reduce not only the displacement of the rim 20 in the axial direction but also the thermal stress occurring in the web 30.

In the present embodiment, the web position Pw is preferably 0.3 times or more the width Wr of the rim 20. It is thereby possible to further reduce the displacement of the rim 20 in the axial direction.

In the present embodiment, the angle θ that the plate-thickness center line A forms with the axial direction on the flange 22 side is preferably set at 87° or less. It is thereby possible to reduce the displacement of the rim 20 in the axial direction and the thermal stress occurring in the web 30 more reliably.

In the present embodiment, the plate thickness of the web 30 decreases as the web 30 extends outward in the radial direction until a point inward from the outer end Aa of the plate-thickness center line A and is minimized at the point. More specifically, in the web 30, the position at which the bending stress produced by a bending load received from a rail when the railway vehicle passes a curve is made to substantially coincide with the position at which the plate thickness is minimized. With this configuration, it is possible to prevent fatigue fracture of the web 30, increasing a life of the wheel 100.

An embodiment according to the present disclosure is described above, but the present disclosure is not limited to the above embodiment, and various modifications may be made without departing the gist and scope of the present disclosure.

EXAMPLE

The present disclosure will be described below more in detail with reference to EXAMPLE. However, the present disclosure should not be construed to be limited to the EXAMPLE described below.

To evaluate effects brought by a wheel for a railway vehicle according to the present disclosure, a numerical analysis by the finite element method (FEM analysis) was conducted. In the FEM analysis, an analytic model having the same shape as that of the wheel 100 according to the above-described embodiment (FIG. 1) was created, and evaluation was conducted on the analytic model while the angle of the plate-thickness center line A (plate angle) θ [°] and the web position Pw [mm] were changed. For the purpose of comparison, the evaluation was conducted on analytic models each having a wheel shape that is generally used in Europe or North America.

Figure 3:
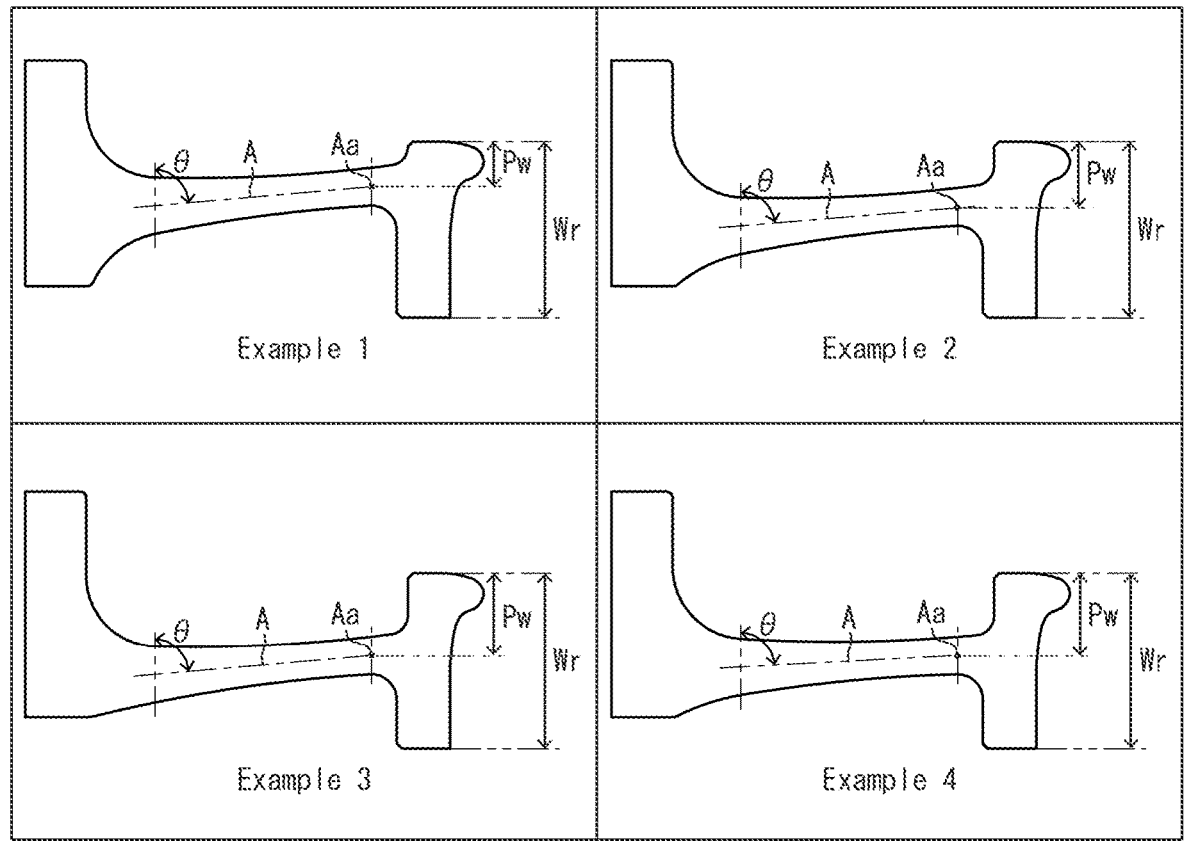
FIG. 3 is a diagram illustrating wheel shapes of analytic models of Examples.
Figure 4A:
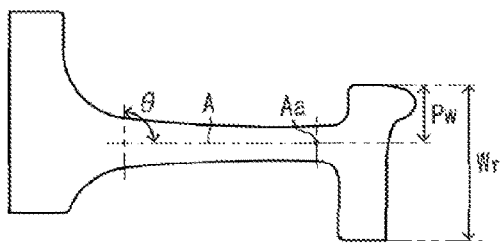
FIGS. 4A-4E are diagrams Iillustrating wheel shapes of analytic models of Comparative Examples.
Figure 4B:
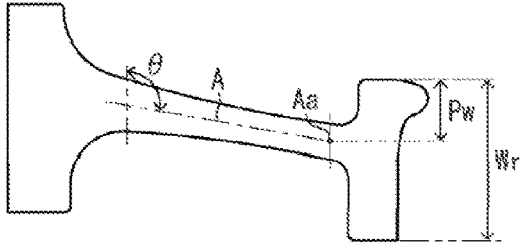
Figure 4C:
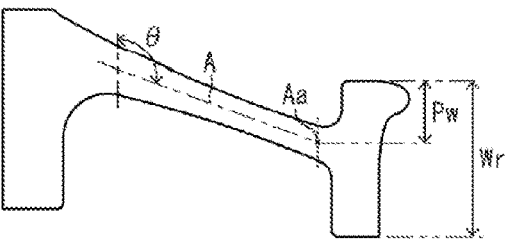
Figure 4D:
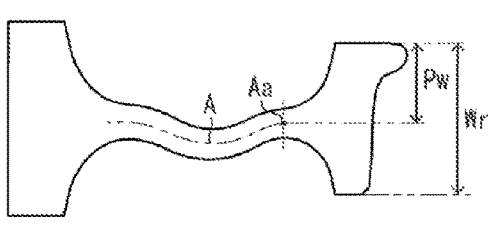
Figure 4E:
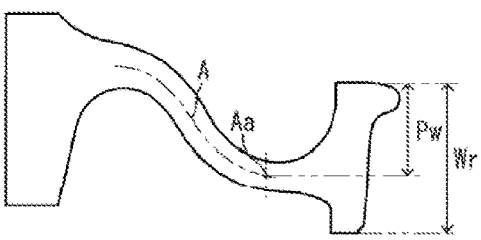

FIG. 3 is a diagram illustrating wheel shapes (outlines in ½ section) of analytic models of Examples 1 to 4. The wheel shapes of the analytic models of Examples 1 to 4 are all such that their bosses are positioned closer to a center of a track (closer to a center of a wheelset) than their rims. FIG. 4 is a diagram illustrating wheel shapes (outlines in ½ section) of analytic models of Comparative Examples 1 to 5. Referring to FIG. 3 and FIG. 4, in Examples 1 to 4 and Comparative Examples 1 to 3, their plate-thickness center lines A were linear. However, in Examples 1 to 4, their plate angles θ were less than 90°, but in Comparative Examples 1 to 3, their plate angles θ were 90° or more. As illustrated in FIG. 4, in Comparative Example 4 and Comparative Example 5, their plate-thickness center lines A bend unlike Examples 1 to 4 and Comparative Examples 1 to 3. The analytic model of Comparative Example 4 has a wheel shape that is generally used in Europe. The analytic model of Comparative Example 5 has a wheel shape that is generally used in North America. Shape parameters of each analytic model are shown in Table 1.

TABLE 1

|  | Plate angle θ [°] | Web position Pw [mm] | Web position Pw/ Rim width Wr |
| --- | --- | --- | --- |
| Example 1 | 85 | 36 | 0.26 |
| Example 2 | 85 | 52 | 0.37 |
| Example 3 | 85 | 66 | 0.47 |
| Example 4 | 87 | 66 | 0.47 |
| Comparative Example 1 | 90 | 52 | 0.37 |
| Comparative Example 2 | 100 | 52 | 0.37 |
| Comparative Example 3 | 110 | 52 | 0.37 |
| Comparative Example 4 | — | 72 | 0.51 |
| Comparative Example 5 | — | 93 | 0.66 |

The FEM analysis was conducted with general-purpose software (ABAQUS Ver.6.12, from Dassault Systemes SE). In the analysis, to simulate braking of a railway vehicle with a tread brake, heat flux was provided to a region of a tread of a wheel that is to come into contact with a brake shoe of the tread brake. Braking duration was set at 1200 seconds, and an inner circumferential portion of a wheel was fully constrained. In addition, to evaluate a stress occurring in a wheel when a railway vehicle travels on a rail (mechanical stress), a load was applied to a tread of the wheel at a position at which the tread is to come into contact with the rail. At this time, the load was set at 40 t for each wheelset.

Results of the FEM analysis are shown in Table 2. In Table 2, Rim displacement [mm] indicates a maximum displacement of a rim in the axial direction during braking, where a displacement in the flange direction is indicated as negative, and a displacement in the counter-flange direction is indicated as positive. The rim displacement was evaluated at a position at a diameter of 890 mm of a wheel on a side face of a rim on its flange side. Web thermal stress indicates a maximum stress in a web during braking. Web mechanical stress indicates a maximum value of a stress amplitude of a web that occurs while a wheel makes one revolution on a rail (½ of stress range). Table 2 shows, for each of Examples and Comparative Examples, a web thermal stress is expressed in a form of its ratio to a web thermal stress of Example 1, and a web mechanical stress is expressed in a form of its ratio to a web mechanical stress of Example 1.

TABLE 2

|  | Rim displacement [mm] | Web thermal stress [—] | Web mechanical stress [—] |
| --- | --- | --- | --- |
| Example 1 | −1.5 | 1.00 | 1.00 |
| Example 2 | −0.7 | 0.96 | 1.00 |
| Example 3 | −0.2 | 0.86 | 0.91 |
| Example 4 | −0.4 | 0.75 | 0.99 |

TABLE 2-continued

|  | Rim displacement [mm] | Web thermal stress [—] | Web mechanical stress [—] |
|---|---|---|---|
| Comparative Example 1 | −2.0 | 0.78 | 1.05 |
| Comparative Example 2 | −3.8 | 0.99 | 0.78 |
| Comparative Example 3 | −3.8 | 0.92 | 1.00 |
| Comparative Example 4 | −0.2 | 1.29 | 0.99 |
| Comparative Example 5 | −2.4 | 0.77 | 1.14 |

In Comparative Example 5, its plate-thickness center line A was formed in a substantially S shape, and in its web, a root portion of its boss was separated from a root portion of its rim in the axial direction (FIG. 4). With such a wheel shape, reduction in the web thermal stress can be designed, but the rim displacement cannot be reduced. Actually, in Comparative Example 5, its rim displacement was −2.4 mm, and the result was that its rim is significantly displaced in the flange direction. In contrast, in Examples 1 to 4, in which their plate-thickness center lines A were linear, their rim displacements were −1.5 mm to −0.2 mm, which were reduced as compared with Comparative Example 5.

In Comparative Examples 1 to 3, their plate-thickness center lines A were linear as in Examples 1 to 4. However, although the plate angles θ of Examples 1 to 4 were less than 90°, the plate angles θ of Comparative Examples 1 to 3 were 90° or more. In Comparative Examples 1 to 3, their rim displacements were −2.0 mm to −3.8 mm. In contrast, in Examples 1 to 4, in which their plate angles θ were less than 90°, their rim displacements were −1.5 mm to −0.2 mm, which were small as compared with Comparative Examples 1 to 3. In particular, in Examples 2 to 4, in which ratios of their web positions Pw [mm] to their rim widths Wr [mm] were 0.3 or more, the results were that their rim displacements fell within a tolerated range according to European standards EN 13979-1 (−1.0 mm to 3.0 mm).

In Comparative Example 4, its web was provided with two inflection points (FIG. 4). With such a wheel shape, reduction in the rim displacement can be designed, but the web thermal stress cannot be reduced. Actually, in Comparative Example 4, a ratio of its web thermal stress (to that of Example 1) was as high as 1.29. In contrast, in Examples 1 to 4, in which their plate-thickness center lines A were linear, ratios of their web thermal stresses (to that of Example 1) were reduced to 0.75 to 1.00. In Examples 2 to 4, in which their web positions Pw were relatively large, their web thermal stresses were further reduced.

Web thermal stresses of Comparative Examples 1 to 3 were also reduced as compared with Comparative Example 4. In particular, the web thermal stress of Comparative Example 1, in which its plate angle θ was 90°, was smaller than the web thermal stresses of Examples 1 to 3. However, in Comparative Example 1, its web mechanical stress was large as compared with Examples. Therefore, considering the web mechanical stress, the plate angle θ needs to be less than 90°.

It was thus confirmed that, in a wheel for a railway vehicle, by making its plate-thickness center line A linear, inclining the plate-thickness center line A such that the plate-thickness center line A approaches a flange side as the plate-thickness center line A extends outward in a radial direction, and making its plate angle θ less than 90°, it is possible to reduce a rim displacement and a web thermal stress at the same time. According to the analysis results of Examples 1 to 4, by making the plate angle θ 87° or less, it is possible to reduce the rim displacement and the web thermal stress more reliably. In addition, according to the analysis results of Examples 2 to 4, when a ratio of the web position Pw to the rim width Wr is 0.3 or more, it is possible to further reduce the rim displacement.

REFERENCE SIGNS LIST

100: wheel
10: boss
20: rim
21: tread
22: flange
30: web
A: plate-thickness center line

The invention claimed is:

1. A wheel to be used in a railway vehicle, the wheel comprising:
    a boss that forms an inner circumferential portion of the wheel and into which an axle of the railway vehicle is to be inserted;
    a rim that forms an outer circumferential portion of the wheel and includes a tread to come into contact with a top surface of a rail on which the railway vehicle travels and a flange protruding outward from the tread in a radial direction of the wheel, wherein the rim is positioned so as to be outward from the boss in a track-width direction; and
    a web that has an annular shape and connects the boss and the rim, wherein
    when the wheel is viewed in a longitudinal section,
    the web has a plate-thickness center line having a linear shape and two ends, the plate-thickness center line being inclined such that the plate-thickness center line approaches a flange side as the plate-thickness center line extends outward in the radial direction, and
    of the two ends of the plate-thickness center line, an outer end that is positioned more outward in the radial direction is positioned between the flange and a center of the tread in an axial direction of the wheel.

2. The wheel according to claim 1, wherein a distance in the axial direction from a side face of the rim on the flange side to the outer end of the plate-thickness center line is 0.3 times or more a length of the rim in the axial direction.

3. The wheel according to claim 1, wherein an angle that the plate-thickness center line forms with the axial direction on the flange side is 87° or less.

4. The wheel according to claim 1, wherein the web has a plate thickness that decreases as the web extends outward in the radial direction until a point inward from the outer end of the plate-thickness center line and has a minimum plate thickness at the point.

5. The wheel according to claim 2, wherein an angle that the plate-thickness center line forms with the axial direction on the flange side is 87° or less.

6. The wheel according to claim 2, wherein the web has a plate thickness that decreases as the web extends outward in the radial direction until a point inward from the outer end of the plate-thickness center line and has a minimum plate thickness at the point.

7. The wheel according to claim 3, wherein the web has a plate thickness that decreases as the web extends outward in the radial direction until a point inward from the outer end of the plate-thickness center line and has a minimum plate thickness at the point.

\* \* \* \* \*